UNITED STATES PATENT OFFICE.

EDWARD C. SHERIDAN, OF WEST BLOOMINGDALE, NEW JERSEY.

IMPROVEMENT IN MOLDS FOR VULCANIZING HARD RUBBER.

Specification forming part of Letters Patent No. 151,060, dated May 19, 1874; application filed April 9, 1874.

*To all whom it may concern:*

Be it known that I, EDWARD C. SHERIDAN, of West Bloomingdale, in the county of Passaic and State of New Jersey, have invented an Improved Mold for Vulcanizing Hard Rubber, of which the following is a specification:

My improvement consists in the materials I use in the composition of my molds.

Molds have been made of iron, brass, steel, and, perhaps, of other materials; but the use of these metals has necessitated the use of a lining. A steel mold is in common use, but it may not be used for vulcanizing in; but tin-foil is put into it as a lining, in which the rubber is vulcanized after being taken from the mold; and when the process of baking is completed the tin-foil has to be stripped off, involving a loss of time, and it cannot be used again but by being melted over, which also involves a waste of time and of materials; and, besides, the blanks are left in so rough a condition as to require much labor in smoothing them.

My mold obviates all these difficulties.

I use in the construction about equal parts of copper, lead, German silver, and antimony, fused into one mass, which proves to be a composition having valuable properties for the purposes of molding and vulcanizing. It has a very fine grain, which leaves the comb-blank so smooth that a very little time only is required in polishing it. It can be used without change, and without lining in which to vulcanize the blanks; and the same mold may be used many times over in wet or dry heat, and thus cheapen the price of making combs.

It is of great value to be able to vulcanize the comb-blanks in the same molds in which they are produced.

Slight variations may be made in the proportions of these metals, retaining still substantially this composition of a metal admitting of a fine polish, and that will stand the heat required in vulcanizing, and to which the rubber never adheres, but from which in the molds the blanks are readily taken on their being opened.

I claim—

The mold for vulcanizing hard rubber, composed of copper, lead, German silver, and antimony, substantially in the proportions, and for the purposes set forth.

EDWARD C. SHERIDAN.

Witnesses:
HORACE HARRIS,
FRANK. N. REEVE.